US012700016B1

(12) United States Patent
Lin et al.

(10) Patent No.: US 12,700,016 B1
(45) Date of Patent: Aug. 4, 2026

(54) DISENGAGEMENT PREVENTION INCENTIVE

(71) Applicant: Walmart Apollo, LLC, Bentonville, AR (US)

(72) Inventors: Lawrence David Lin, San Francisco, CA (US); Faezeh Akhavizadegan, Mountain View, CA (US); Chia-Yen Ho, Cupertino, CA (US); Yokila Arora, San Jose, CA (US); Topojoy Biswas, Pleasanton, CA (US); Tanya Mendiratta, Fremont, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 19/042,796

(22) Filed: Jan. 31, 2025

(51) Int. Cl.
*G06Q 30/02* (2023.01)
*G06Q 30/0207* (2023.01)
*G06Q 30/0217* (2023.01)

(52) U.S. Cl.
CPC ..... *G06Q 30/0218* (2013.01); *G06Q 30/0239* (2013.01)

(58) Field of Classification Search
CPC ........ G06Q 30/0218; G06Q 30/0207–30/0277
See application file for complete search history.

(56) References Cited

U.S. PATENT DOCUMENTS

| | | | | |
|---|---|---|---|---|
| 8,903,909 | B1 * | 12/2014 | Marra .................... | G06Q 50/01 |
| | | | | 709/200 |
| 9,390,402 | B1 * | 7/2016 | Kane, Jr. ............ | G06Q 30/0645 |
| 10,747,400 | B1 * | 8/2020 | Majumder ............ | G06F 16/248 |
| 11,244,342 | B1 | 2/2022 | Chang et al. | |
| 11,533,330 | B2 * | 12/2022 | Stergioudis ............. | H04L 63/10 |
| 11,574,339 | B1 * | 2/2023 | Lim ................... | G06Q 30/0254 |
| 12,417,468 | B1 | 9/2025 | Gu et al. | |

(Continued)

FOREIGN PATENT DOCUMENTS

| | | |
|---|---|---|
| WO | 2010082885 A1 | 7/2010 |
| WO | 2024242954 A1 | 11/2024 |

OTHER PUBLICATIONS

FasterCapital, "Using Customer Segmentation for Churn Prediction and Retention Update," Jun. 16, 2024, 108 pages.

(Continued)

*Primary Examiner* — Thuy N Nguyen
(74) *Attorney, Agent, or Firm* — Morgan, Lewis & Bockius LLP; Manita Rawat

(57) ABSTRACT

Example implementations relate to systems and methods for detecting disengagement. In an example, a system determines, by a risk identifier, predetermined risk labels based on the user data. The system determines, using a risk evaluator that receives input features, a risk of disengagement for a user. The system determines, using a risk interpreter that receives the input features and the predetermined risk labels, a disengagement reason for the user. The system also determines, based on the risk of disengagement and the disengagement reason, a disengagement prevention incentive for the user. The system further presents, at a computing device associated with the user, a user interface element for interacting with the disengagement prevention incentive.

20 Claims, 8 Drawing Sheets

(56) References Cited

U.S. PATENT DOCUMENTS

| | | | | |
|---|---|---|---|---|
| 12,488,244 | B1* | 12/2025 | Uva | G06N 3/08 |
| 2012/0054020 | A1 | 3/2012 | Jacobs | |
| 2013/0054306 | A1 | 2/2013 | Bhalla et al. | |
| 2014/0278308 | A1* | 9/2014 | Liu | G06F 16/958 |
| | | | | 703/6 |
| 2017/0017971 | A1* | 1/2017 | Moreau | G06Q 30/0202 |
| 2017/0344553 | A1* | 11/2017 | Evnine | G06F 16/24578 |
| 2018/0211285 | A1 | 7/2018 | Todasco et al. | |
| 2019/0057400 | A1* | 2/2019 | Nair | G06Q 20/20 |
| 2019/0087862 | A1* | 3/2019 | Schiano | G06Q 30/0267 |
| 2019/0147393 | A1* | 5/2019 | McCafferty | G06V 20/52 |
| | | | | 340/572.1 |
| 2019/0180309 | A1 | 6/2019 | Suggu et al. | |
| 2019/0340684 | A1* | 11/2019 | Belanger | G06N 3/08 |
| 2020/0097997 | A1* | 3/2020 | Li | G06N 20/00 |
| 2020/0302478 | A1 | 9/2020 | Martinez et al. | |
| 2020/0357062 | A1* | 11/2020 | Belanger | G06N 3/08 |
| 2021/0027184 | A1 | 1/2021 | Heuser | |
| 2021/0201177 | A1* | 7/2021 | Convolbo | G06Q 30/0207 |
| 2021/0350403 | A1* | 11/2021 | Tietzen | G06Q 30/0226 |
| 2022/0067816 | A1* | 3/2022 | Miyassi | G06Q 30/0201 |
| 2022/0093101 | A1* | 3/2022 | Krishnan | G06V 40/20 |
| 2022/0318844 | A1 | 10/2022 | Ivanco et al. | |
| 2023/0097572 | A1* | 3/2023 | Furbish | G06F 40/174 |
| | | | | 704/9 |
| 2024/0211974 | A1 | 6/2024 | Krishna et al. | |
| 2024/0386467 | A1* | 11/2024 | Rajamani | G06N 20/00 |
| 2025/0131474 | A1* | 4/2025 | Santhar | G06Q 30/0256 |
| 2025/0232329 | A1* | 7/2025 | Mahajan | G06Q 10/0836 |
| 2025/0307865 | A1 | 10/2025 | Majumdar et al. | |

OTHER PUBLICATIONS

Insight, "How to Predict Customer Churn with Text Mining," Downloaded: Nov. 26, 2024, 4 pages.

Zoho Corporation, "Pedict customer churn using Zia," (Year: 2024), 21 pages.

C. Kirui et al., "Predicting Customer Churn in Mobile Telephony Industry Using Probabilistic Classifiers in Data Mining," IJCSI International Journal of Computer Sciences Issues, vol. 10, Issue 2, No. 1, Mar. 2013, pp. 165-172.

* cited by examiner

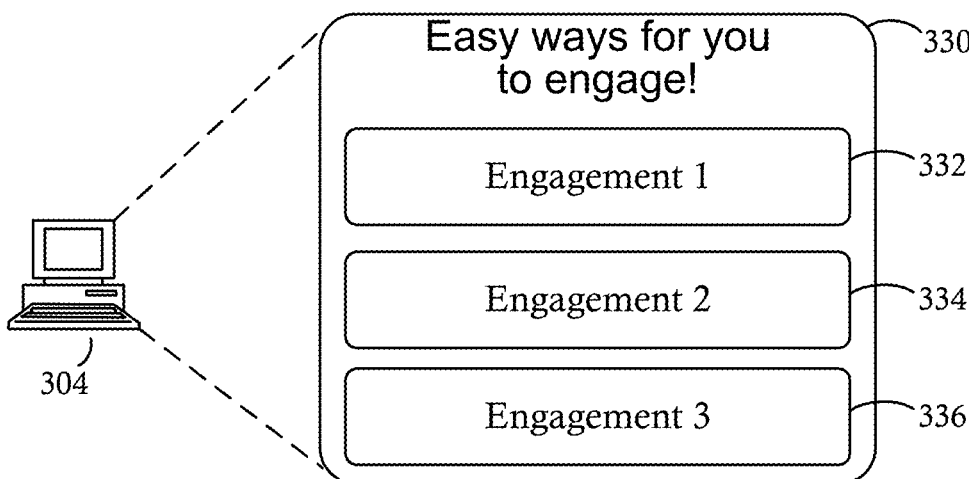
FIG. 3

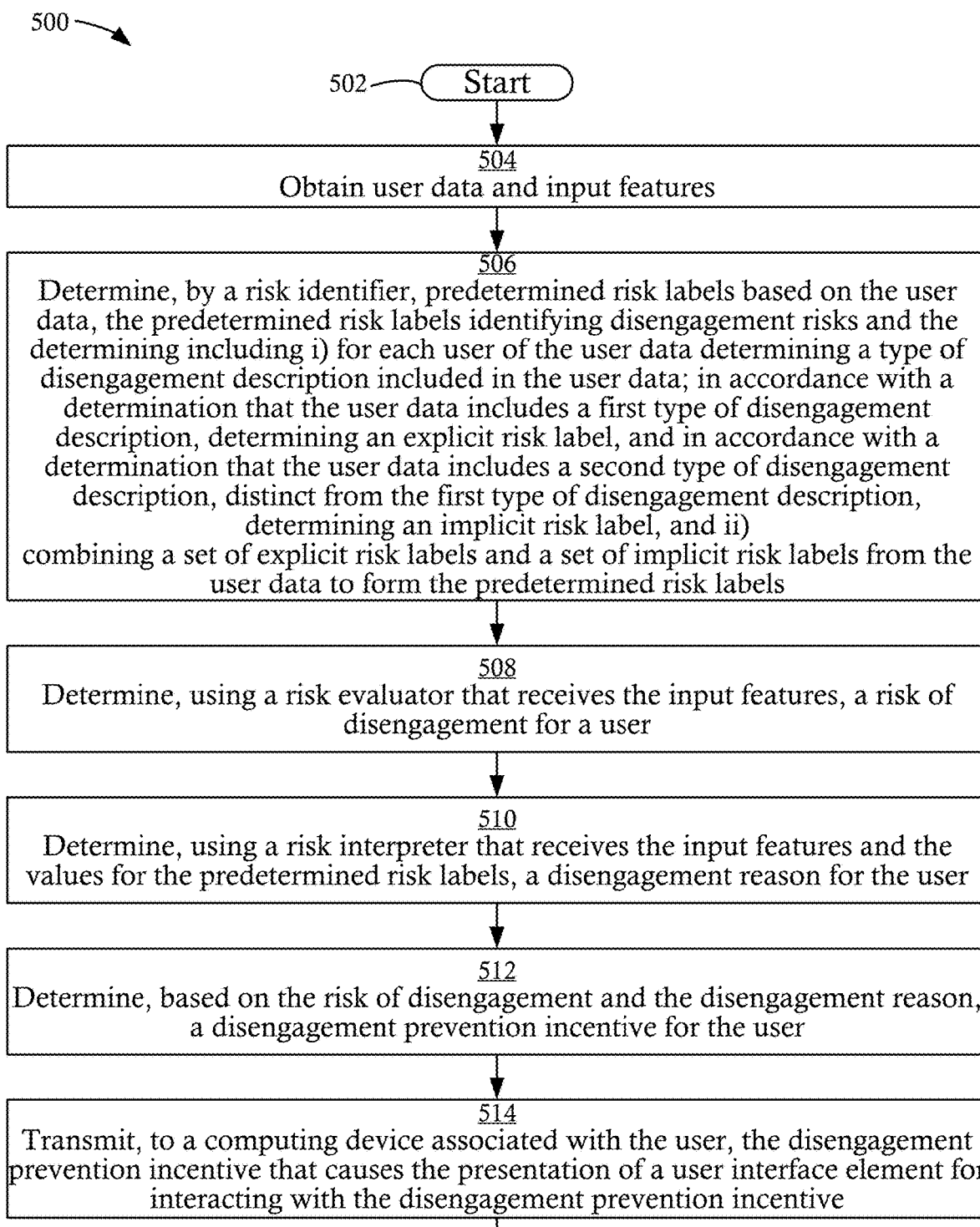

500

502 — ( Start )

504
Obtain user data and input features

506
Determine, by a risk identifier, predetermined risk labels based on the user data, the predetermined risk labels identifying disengagement risks and the determining including i) for each user of the user data determining a type of disengagement description included in the user data; in accordance with a determination that the user data includes a first type of disengagement description, determining an explicit risk label, and in accordance with a determination that the user data includes a second type of disengagement description, distinct from the first type of disengagement description, determining an implicit risk label, and ii) combining a set of explicit risk labels and a set of implicit risk labels from the user data to form the predetermined risk labels

508
Determine, using a risk evaluator that receives the input features, a risk of disengagement for a user

510
Determine, using a risk interpreter that receives the input features and the values for the predetermined risk labels, a disengagement reason for the user

512
Determine, based on the risk of disengagement and the disengagement reason, a disengagement prevention incentive for the user

514
Transmit, to a computing device associated with the user, the disengagement prevention incentive that causes the presentation of a user interface element for interacting with the disengagement prevention incentive 516 — ( End )

602
Determining the explicit risk label includes determining whether the first type of disengagement description includes structured data; in accordance with a determination that the first type of disengagement description includes structured data, determining a first risk label based on the structured data; determining whether the first type of disengagement description includes unstructured data; in accordance with a determination that the first type of disengagement description includes unstructured data, determining a second risk label based on the unstructured data; and in accordance with a determination that the first and second risk labels are the same, including the first or second risk label in the set of explicit risk labels

604
In accordance with a determination that the first and second risk labels are different, determining respective scores for the first and second risk labels and selecting a respective risk label with a score that satisfies a risk label threshold to include in the set of explicit risk labels

606
Determining the second risk label based on the unstructured data includes determining a TF-IDF value for the unstructured data and in accordance with a determination that the TF-IDF value for the unstructured data satisfies a TF-IDF threshold for a predetermined segment, associating the predetermined segment to the second risk label

608
In accordance with a determination that the first type of disengagement description includes structured data, determining a first risk label based on the structured data and including the first risk label in the set of explicit risk labels

610
In accordance with a determination that the first type of disengagement description includes unstructured data, determining a second risk label based on the unstructured data and including the second risk label in the set of explicit risk labels

612
Determining the implicit risk label includes determining user profile data from the second type of disengagement description; determining an implicit risk label based on the user profile data; and including the implicit risk label in the set of implicit risk labels

FIG. 6

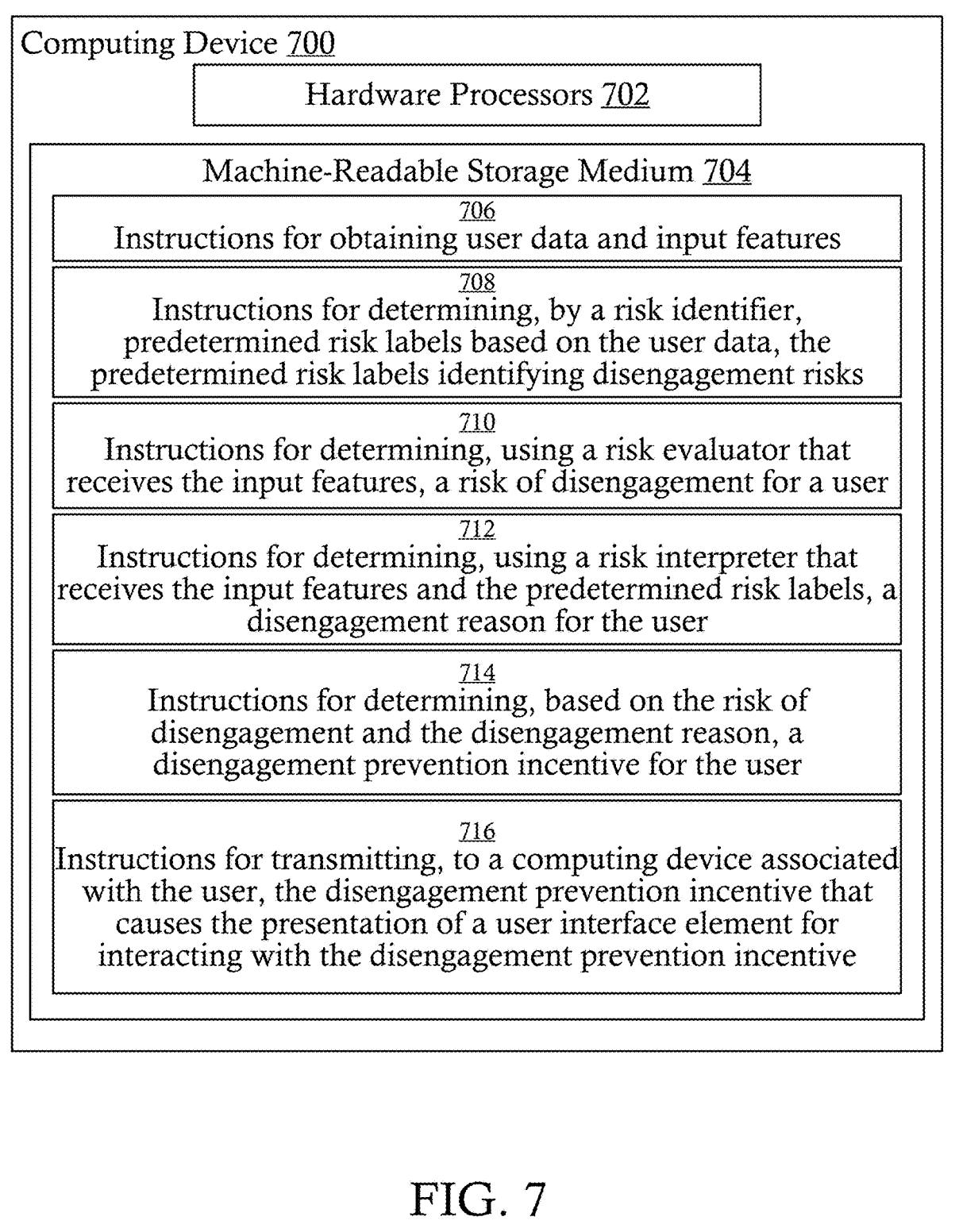

Computing Device 700

Hardware Processors 702

Machine-Readable Storage Medium 704

706
Instructions for obtaining user data and input features

708
Instructions for determining, by a risk identifier, predetermined risk labels based on the user data, the predetermined risk labels identifying disengagement risks 710
Instructions for determining, using a risk evaluator that receives the input features, a risk of disengagement for a user 712
Instructions for determining, using a risk interpreter that receives the input features and the predetermined risk labels, a disengagement reason for the user 714
Instructions for determining, based on the risk of disengagement and the disengagement reason, a disengagement prevention incentive for the user 716
Instructions for transmitting, to a computing device associated with the user, the disengagement prevention incentive that causes the presentation of a user interface element for interacting with the disengagement prevention incentive

FIG. 7

DISENGAGEMENT PREVENTION INCENTIVE

TECHNICAL FIELD

This application relates generally to detecting risk of disengagement, and more particularly, to determining reasons for disengagement and the generation of personalized incentive.

BACKGROUND

Systems rely on user feedback to determine dissatisfaction. The user feedback can be incomplete and/or imprecise, which can result in inaccurate determinations of disengagement risks. Additionally, due to deficiencies in user feedback, the determination of disengagement risks may be determined after a user has already disengaged.

BRIEF DESCRIPTION OF THE DRAWINGS

Various examples will be described below with reference to the following figures.

FIG. 3 depicts example disengagement prevention incentives provided to users, in accordance with some embodiments.

FIG. 5 depicts a flow diagram of a method for detecting disengagement and generating disengagement prevention incentives, in accordance with some embodiments.

FIG. 6 depicts an example method expanding on the method for detecting disengagement and generating disengagement prevention incentives, in accordance with some embodiments.

FIG. 7 depicts an example system with a machine-readable medium that includes instructions for detecting disengagement and generating disengagement prevention incentives, in accordance with some embodiments.

DETAILED DESCRIPTION

Figure 1:
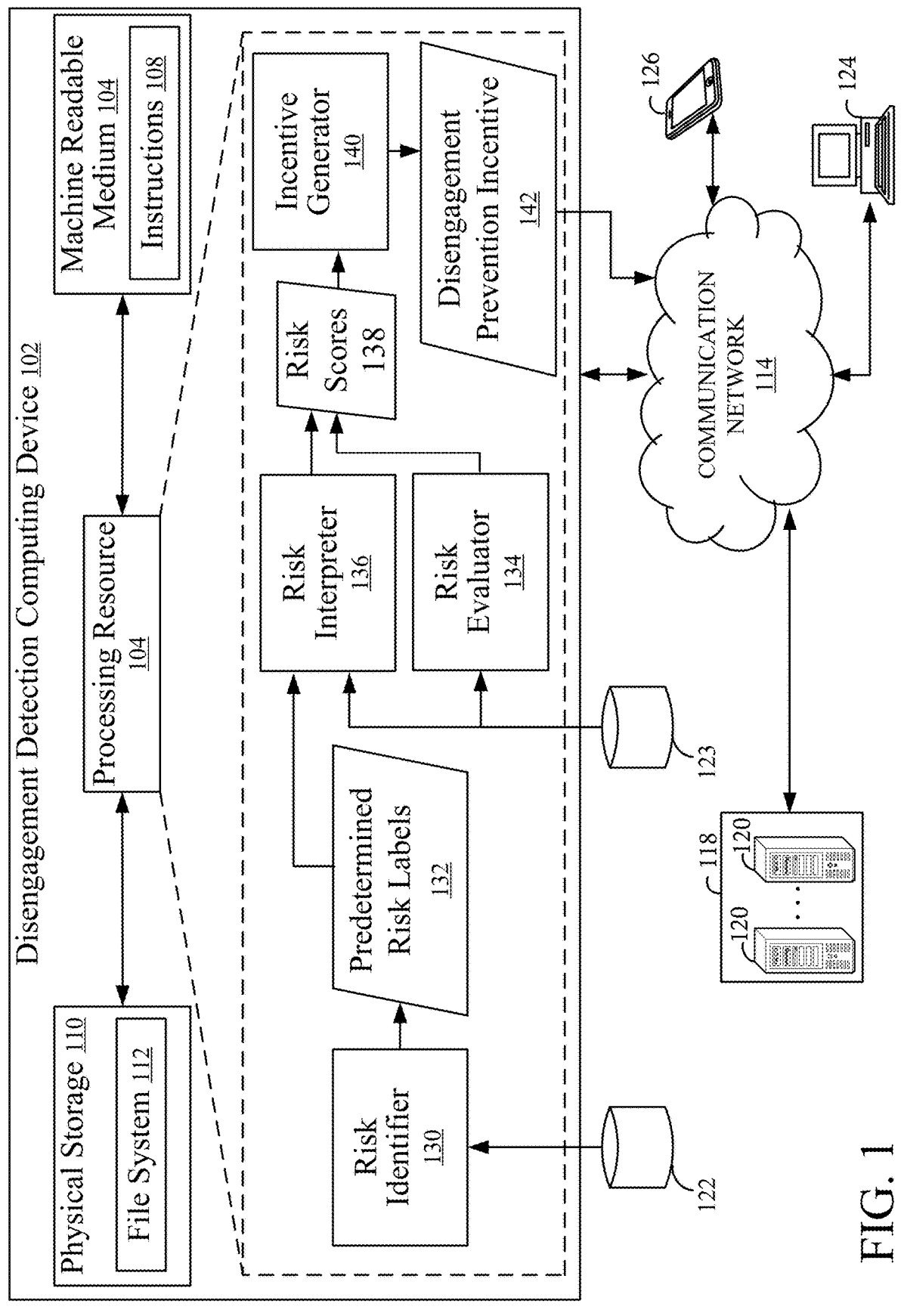
FIG. 1 depicts an example system that provides personalized incentives or causes the performance of personalized countermeasures, in accordance with some embodiments.

This description of the example embodiments is intended to be read in connection with the accompanying drawings that are to be considered part of the entire written description. Terms concerning data connections, coupling and the like, such as "connected" and "interconnected," and/or "in signal communication with" refer to a relationship wherein systems or elements are electrically connected (e.g., wired, wireless, etc.) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these example embodiments in connection with the accompanying drawings.

In various embodiments, a system including a processor and a non-transitory memory storing instructions, that when executed, cause the processor to perform one or more operations for detecting disengagement and generating disengagement prevention incentives is disclosed. The instructions, when executed, cause the processor to obtain user data and input features. The instructions, when executed, cause the processor to determine, by a risk identifier, predetermined risk labels based on the user data. The predetermined risk labels identify disengagement risks. Determining the predetermined risk labels includes, for each user of the user data, determining a type of disengagement description included in the user data; in accordance with a determination that the user data includes a first type of disengagement description, determining an explicit risk label; and in accordance with a determination that the user data includes a second type of disengagement description, distinct from the first type of disengagement description, determining an implicit risk label. Determining the predetermined risk labels further includes combining a set of explicit risk labels and a set of implicit risk labels from the user data to form the predetermined risk labels. The instructions, when executed, cause the processor to determine, using a risk evaluator that receives the input features, a risk of disengagement for a user. The instructions, when executed, cause the processor to determine, using a risk interpreter that receives the input features and the predetermined risk labels, a disengagement reason for the user. The instructions, when executed, cause the processor to determine, based on the risk of disengagement and the disengagement reason, a disengagement prevention incentive for the user, and transmit, to a computing device associated with the user, the disengagement prevention incentive. The disengagement prevention incentive causes the presentation of a user interface element for interacting with the disengagement prevention incentive.

In various embodiments, a computer-implemented method for detecting disengagement and generating disengagement prevention incentives is disclosed. The computer-implemented method includes obtaining user data and input features. The computer-implemented method includes determining, by a risk identifier, predetermined risk labels based on the user data. The predetermined risk labels identify disengagement risks. Determining the predetermined risk labels includes, for each user of the user data, determining a type of disengagement description included in the user data; in accordance with a determination that the user data includes a first type of disengagement description, determining an explicit risk label; and in accordance with a determination that the user data includes a second type of disengagement description, distinct from the first type of disengagement description, determining an implicit risk label. Determining the predetermined risk labels further includes combining a set of explicit risk labels and a set of implicit risk labels from the user data to form the predetermined risk labels. The computer-implemented method includes determining, using a risk evaluator that receives the input features, a risk of disengagement for a user. The computer-implemented method includes determining, using a risk interpreter that receives the input features and the predetermined risk labels, a disengagement reason for the user. The computer-implemented method includes determining, based on the risk of disengagement and the disengagement reason, a disengagement prevention incentive for the user; and transmitting, to a computing device associated with the user, the disengagement prevention incentive. The disengagement prevention incentive causes the presentation of a user interface element for interacting with the disengagement prevention incentive.

In various embodiments, a non-transitory computer readable medium having instructions for detecting disengagement and generating disengagement prevention incentives is disclosed. The instructions, when executed by at least one processor, cause the at least one device to perform operations including obtaining user data and input features. The instructions, when executed by at least one processor, cause the at least one device to perform operations including determining, by a risk identifier, predetermined risk labels based on the user data. The predetermined risk labels identify disengagement risks. Determining the predetermined risk labels includes, for each user of the user data, determining a type of disengagement description included in the user data; in accordance with a determination that the user data includes a first type of disengagement description, determining an explicit risk label; and in accordance with a determination that the user data includes a second type of disengagement description, distinct from the first type of disengagement description, determining an implicit risk label. Determining the predetermined risk labels further includes combining a set of explicit risk labels and a set of implicit risk labels from the user data to form the predetermined risk labels. The instructions, when executed by at least one processor, cause the at least one device to perform operations including determining, using a risk evaluator that receives the input features, a risk of disengagement for a user. The instructions, when executed by at least one processor, cause the at least one device to perform operations including determining, using a risk interpreter that receives the input features and the predetermined risk labels, a disengagement reason for the user. The instructions, when executed by at least one processor, cause the at least one device to perform operations including determining, based on the risk of disengagement and the disengagement reason, a disengagement prevention incentive for the user; and transmitting, to a computing device associated with the user, the disengagement prevention incentive. The disengagement prevention incentive causes the presentation of a user interface element for interacting with the disengagement prevention incentive.

Furthermore, in the following, various embodiments are described with respect to methods and systems for detecting disengagement and generating disengagement prevention incentives. In various embodiments, the system and method disclosed herein use a risk identifier for determining risk labels that are used to train a risk interpreter that determines users at risk of disengaging and the disengagement reasons. The risk interpreter is able to use different risk labels for generating disengagement reasons that are used, in part, to generate personalized interactions or engagements with users. The personalized interactions or engagements are transmitted to a user and/or other computing devices to prevent disengagement. The systems and methods disclosed herein (e.g., a risk identifier) extracts reasons for disengagement (or dealbreakers) from unstructured data by mapping disengagement reasons to explicit dealbreaker labels through term frequency-inverse document frequency (TF-IDF) processes. The systems and methods disclosed herein expand on disengagement reason taxonomy through probabilistic clustering to discover implicit dealbreakers from user profiles (e.g., behavioral data of disengaged users). The systems and methods disclosed herein personalize intervention plans by predicting deal-breaking experiences for high-risk members (e.g., finding user areas of dissatisfaction and high disengagement users and applying the effective interventions or countermeasures).

FIG. 1 depicts an example system 100 that provides personalized incentives or causes the performance of personalized countermeasures for preventing disengagement, in accordance with some embodiments. The system 100 includes a disengagement detection computing device 102 that detects disengagement risks and generates personalized incentives and/or personalized countermeasures. The disengagement detection computing device 102 includes a processing resource 104 that may include one or more microcontrollers, microprocessors, field-programmable gate arrays (FPGAs), application-specific integrated circuits (ASICs), state machines, digital circuitry, and/or any other suitable processing resource. The disengagement detection computing device 102 includes a non-transitory machine readable medium 106 that may include one or more of a random access memory (RAM), read-only memory (ROM), electrically erasable programmable read-only memory (EEPROM), flash memory, hard disk, and/or any other suitable memory resource.

The processing resource 104 may execute instructions 108 (i.e., programming or software code) stored on machine readable medium 106 to perform functions of the disengagement detection computing device 102, such as using a risk identifier 130 for determining predetermined risk labels 132, determining risk scores 138, generating disengagement prevention incentives 142, and transmitting the disengagement prevention incentives 142. The instructions 108 may include instructions for implementing one or more models. In some embodiments, and as will be described further herein below, the disengagement detection computing device 102 may execute one or more models, processes, or algorithms, such as a machine learning model, deep learning model, statistical model, etc., (e.g., as implemented as machine readable instructions), such as the risk identifier 130; a risk evaluator 134; a risk interpreter 136; an incentive generator 140, to determine disengagement risks and/or disengagement reasons.

The disengagement detection computing device 102 may also include other hardware components, such as physical storage 110. Physical storage 110 may include any physical storage device, such as a hard disk drive, a solid state drive, or the like, or a plurality of such storage devices (e.g., an array of disks), and may be locally attached (i.e., installed) in the disengagement detection computing device 102. In some implementations, physical storage 110 may be accessed as a block storage device.

In some cases, the disengagement detection computing device 102 may also include a local file system 112 that may be implemented as a layer on top of the physical storage 110. For example, an operating system 112 may be executing on the disengagement detection computing device 102 (by virtue of the processing resource 104 executing certain instructions 108 related to the operating system) and the operating system 112 may provide a file system 112 to store data on the physical storage 110.

The network 114 may include a plurality of devices or systems in communication with the disengagement detection computing device 102 over one or more network channels, illustrated as a network cloud. For example, in various embodiments, the disengagement detection computing device 102 may be in communication with a web server 116, a cloud-based engine 118 including one or more processing devices 120 that may be provisioned for use, one or more databases (e.g., first and second databases 122 and 123), a workstation 124, and/or any other suitable system or device. The disengagement detection computing device 102 may similarly be in communication, either directly or indirectly, with one or more user computing devices 126 operatively coupled over the network 114. The other computing systems may be similar to the disengagement detection computing device 102, and may each include at least a processing resource and a machine readable medium.

The risk identifier 130 receives first data (e.g., user data) from a first database 122. The first data can include one or more types of disengagement descriptions. The one or more types of disengagement descriptions can include a first type of disengagement descriptions and a second type of disengagement descriptions, distinct from the first type of disengagement descriptions. In some embodiments, the first type of disengagement descriptions are based on inputs or feedback provided by users, and the second type of disengagement descriptions are based on user profiles. As described below, the risk identifier 130 determines explicit risk labels based on user feedback and implicit risk labels inferred from user profiles (e.g., user behavior) that are combined to form the predetermined risk labels 132.

The predetermined risk labels 132 identifying disengagement risks and/or disengagement reasons. Non-limiting examples of disengagement reasons include engagement, price sensitivity, and operational excellence. The predetermined risk labels 132 can define any number of disengagement reasons and/or disengagement risks, and/or combinations thereof. The determination of the predetermined risk labels 132 is described in detail below in reference to FIG. 4.

The risk interpreter 136 receives the predetermined risk labels 132 and second data (e.g., input features) from a second database 123. The risk interpreter 136 determines disengagement reasons for a user based on the predetermined risk labels 132 and the second data. In some embodiments, the risk interpreter 136 provides a score value to each determined disengagement reason for a user. The risk interpreter 136 is trained using a training data set of the predetermined risk labels 132 and second data. The risk evaluator 134 receives the second data from the second database 123 and determines a risk of disengagement for a user. The risk evaluator 134 can identify users with the highest risk of disengagement. The outputs of the risk evaluator 134 and the risk interpreter 136 are combined to form risk scores 138. The risk scores 138 include scores for each disengagement reasons and a disengagement risk score for a user.

The risk scores 138 are provided to the incentive generator 140. The incentive generator 140 uses the risk scores 138 to generate disengagement prevention incentives 142. The disengagement prevention incentives 142 are personalized, based on the risk scores 138, to prevent user disengagement. For example, risk scores for a user can include a first disengagement reason score of 0.8, a second disengagement reason score of 0.2, and a disengagement score of 0.7 (where the sum of the first through n disengagement reason scores is 1 and the disengagement score is between 0 and 1), and the incentive generator 140, based on the risk scores, generates a first disengagement prevention incentive that prevents user disengagement caused by the first disengagement reason. Alternatively, risk scores for another user can include a first disengagement reason score of 0.5, a second disengagement reason score of 0.2, a third disengagement reason score of 0.3, and a disengagement score of 0.3, and the incentive generator 140, based on the risk scores, may forgo generating a disengagement prevention incentive (e.g., as the disengagement score may not satisfy a predetermined disengagement threshold (e.g., 0.4, 0.5, 0.7 (depending on requirements)).

The disengagement prevention incentives 142 are transmitted to computing devices associated with the user. The disengagement prevention incentives 142 can include included in emails, messages, notifications, webpages, user interfaces, and/or etc.

In some embodiments, training data is generated for one or more models (e.g., machine learning models, deep learning models, statistical models, algorithms, etc.) based on the predetermined risk labels 132 and/or input features, etc. One or more models are trained based on corresponding training data. The trained models may be stored in a database, such as in the database 122 and/or 123 (e.g., a cloud storage database).

The models, when executed by the disengagement detection computing device 102, allow the disengagement detection computing device 102 to detect and determine disengagement risks and disengagement reasons and/or generate incentives or countermeasures for preventing user disengagement caused by the disengagement risks and disengagement reasons. For example, the disengagement detection computing device 102 may obtain one or more models from the database 122. The disengagement detection computing device 102 may then receive, in real-time, predetermined risk labels 132 and/or input features. In response to receiving the predetermined risk labels 132 and/or input features, the disengagement detection computing device 102 may execute one or more models to determine disengagement risks and disengagement reasons.

In some embodiments, the disengagement detection computing device 102 assigns the models (or parts thereof) for execution to one or more processing devices 120. For example, each model may be assigned to a virtual machine hosted by a processing device 122. The virtual machine may cause the models or parts thereof to execute on one or more processing units such as GPUs. In some embodiments, the virtual machines assign each model (or part thereof) among a plurality of processing units. Based on the output of the models, disengagement detection computing device 102 may determine disengagement risks and disengagement reasons.

Figure 2:
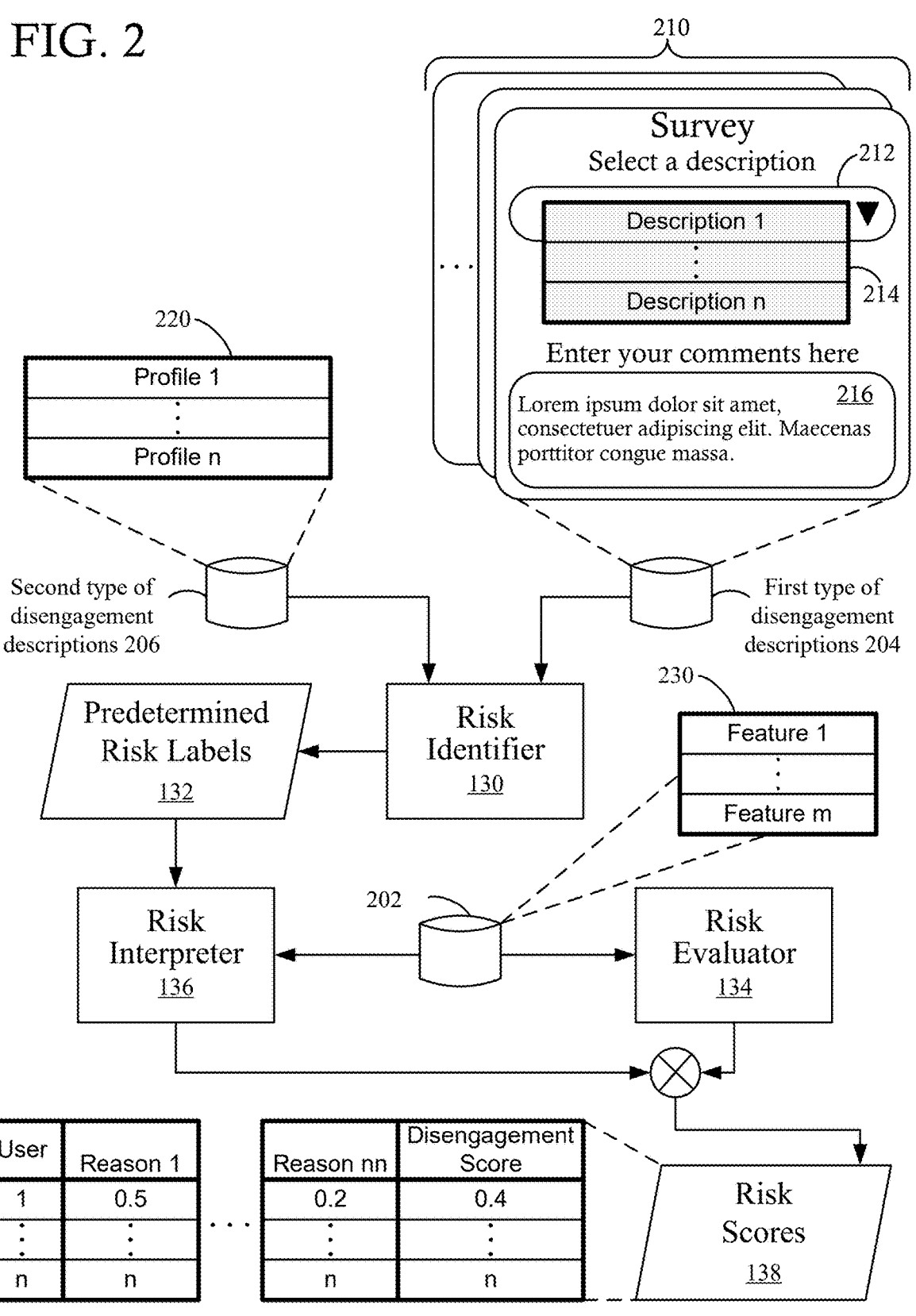
FIG. 2 depicts an example disengagement detection system, in accordance with some embodiments.

FIG. 2 depicts an example disengagement detection and prevention system, in accordance with some embodiments. The disengagement detection and prevention system 200 is analogous to the disengagement detection computing device 102 of FIG. 1. For example, the disengagement detection and prevention system 200 includes at least a risk identifier 130, predetermined risk labels 132, a risk evaluator 134, a risk interpreter 136, and risk scores 138. The disengagement detection and prevention system 200 further includes a first repository 202 for input features, a second repository 204 for a first type of disengagement descriptions, and a third repository 206 for a second type of disengagement descriptions.

The first type of disengagement descriptions include user provided feedback or other information. The first type of disengagement descriptions can be provided via one or more forms or surveys provided by the user. In some embodiments, the one or more forms or surveys are presented to the user via a website hosted by a web server, one or more applications running on a computing device, one or more messages and/or notifications transmitted to a computing device, etc. The one or more forms or surveys can allow a user to provide their feedback as structured and/or unstructured data. For example, example surveys 210 include at least one drop-down menu 212 that allows a user to select a disengagement description. The disengagement description selected via the drop-down menu 212 is a form of structured data. Non-limiting examples of disengagement descriptions can include too expensive, delivery issue, element issues, service issues, lack of engagement, lack of benefits, other, etc. There can be any number of disengagement descriptions. Additionally, the example surveys 210 include at least one free-text field that allows a user to write in their own disengagement description (e.g., a form of unstructured data).

The second type of disengagement descriptions include stored user data and/or profiles 220. In some embodiments, the second type of disengagement descriptions are user behavioral data. For example, the user behavioral data can indicate the user's previous interactions, experiences, transactions, etc. that are connected to disengagement. The user behavioral data can be captured for a predetermined time period (e.g., the last month, six months, a year, etc.).

The input features 230 include any number of features used by the risk interpreter 136 and the risk evaluator 134. As non-limiting examples, the input features can include membership features, transaction features, demographics features, operational satisfaction features, and/or benefit engagement features. Membership features can include a membership tenure, a membership plan, and/or membership management. Transaction features can include fulfilment channels (e.g., shipping, pickup, delivery), customer spend, inter-purchase intervals, order frequency, etc. Demographics features include gender, family size, occupation, income, home ownership (e.g., owner or renter), mortgage, and/or time zones. The operational satisfaction features include nil picks (e.g., unfound items), substituted items, customer contacts, returns, cancels, and/or fulfillment speed. The benefit engagement features include usage frequency, recency, scan and go, etc.

The risk scores 138 can include for each user respective scores for each disengagement reason and a disengagement score. The disengagement reason scores indicate how much weight the disengagement reason has in the overall disengagement score. For example, for user 1, the first disengagement reason 1 has a score of 0.5 and the second disengagement reason 2 has a score of 0.2. As such, an incentive personalized for the first user would aim to prevent disengagement due to the first disengagement reason. Alternatively, the disengagement score indicates a user's risk of disengaging. As described above, the sum of the disengagement reason scores is 1, and the disengagement score is between 0 and 1.

FIG. 3 depicts example disengagement prevention incentives provided to users, in accordance with some embodiments. For example, a first disengagement prevention incentive presented to a first user via a first computing device 302. The first disengagement prevention incentive is presented via a first user interface 320 and includes one or more user interface elements (e.g., a first user interface element 322) and a disengagement prevention dialogue 324. The first user interface element 322 allows the user to accept the first disengagement prevention incentive remotely. The disengagement prevention dialogue 324 can be responsive to an identified disengagement reason and prevent user disengagement caused by the disengagement reason. For example, the identified disengagement reason for the first user can be price sensitivity and the first user interface element 322 and a disengagement prevention dialogue 324 can present incentives to mitigate the users price sensitivity.

A second disengagement prevention incentive is presented to a second user via a second computing device 304. The second disengagement prevention incentive is presented via a second user interface 330 and includes one or more user interface elements (e.g., a second, third, and fourth user interface elements 332, 334, and 336). Each of the user interface elements can be responsive to an identified disengagement reason and prevent disengagement caused by the disengagement reason. For example, the identified disengagement reason for the second user can be lack of engagement and each user interface element can present incentives to increase engagement.

In some embodiments, the disengagement prevention incentives are presented to users on websites or applications hosted by a server. For example, the disengagement prevention incentives can be presented on a splash page, homepage banner, purchase history banner, etc. Non-limiting examples of disengagement prevention incentives can include price reductions, membership suspension, discounts, coupons, advertisement, etc.

In some embodiments, the disengagement prevention incentives are generated to support user experience. For example, disengagement reasons related to operational excellence can include notifying store locations, associates, and personnel of a user's disengagement reasons and request additional care in performing services. For example, if a user has experienced several nil picks, a disengagement prevention incentive can include a request to a store to spend additional time locating an item.

In some embodiments, user responses (or lack of responses) to the disengagement prevention incentives are monitored. User disengagements can be monitored between predetermined time periods to identify changes in disengagement over time. Additionally, or alternatively, in some embodiments, different types (e.g., email, discount, coupon, etc.) of disengagement prevention incentives are monitored to identify the effectiveness of different types (e.g., email, discount, coupon, etc.) of disengagement prevention incentives. In some embodiments, the effectiveness of one or more types of disengagement prevention incentives is based on user preferences, user behavior, and/or other user characteristics, and the systems and methods disclosed herein personalize the disengagement prevention incentives based on the user characteristics, the disengagement reasons, and/or the disengagement risks.

Figure 4:
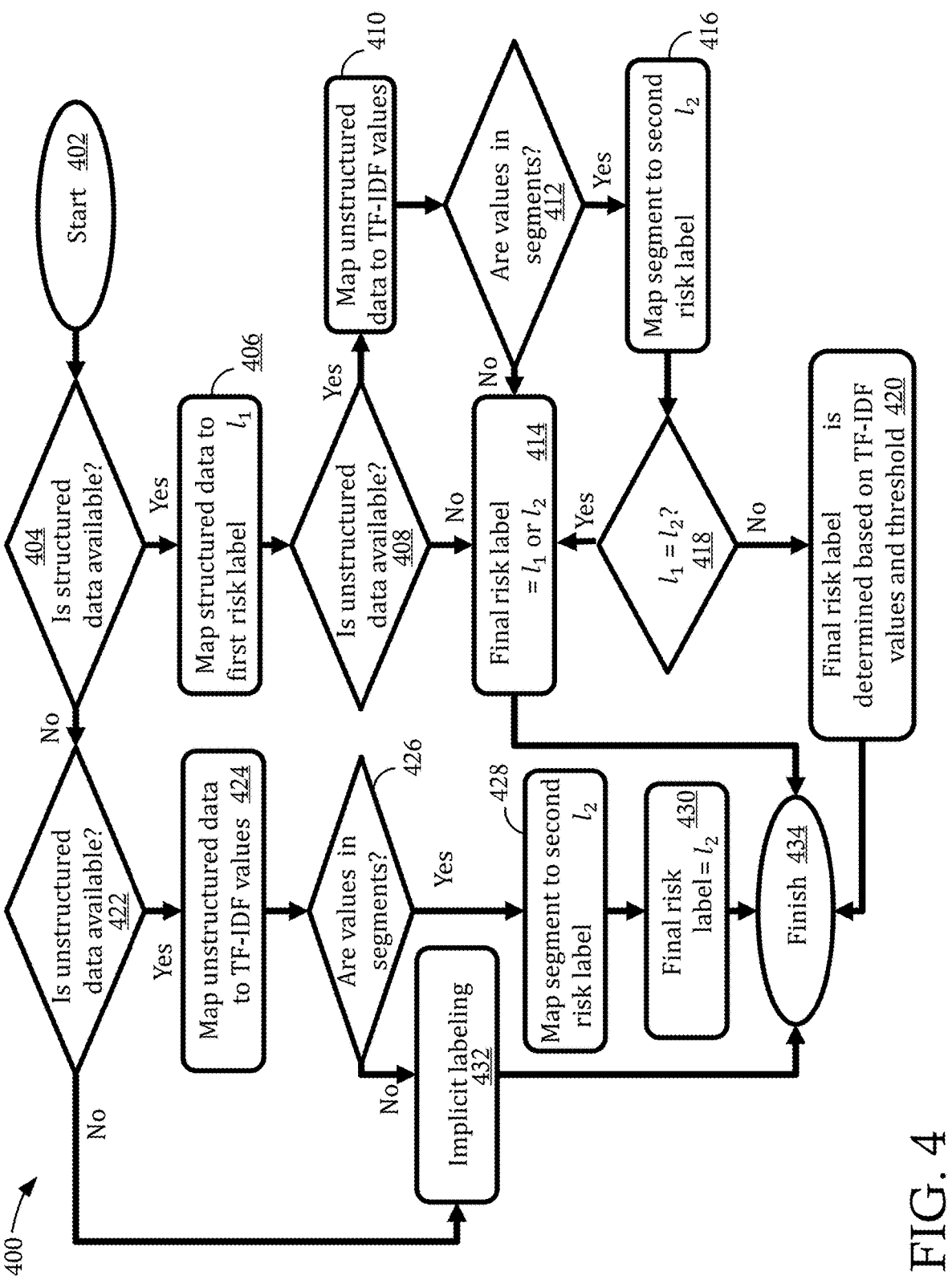
FIG. 4 depicts a flow diagram of a method for determining the predetermined risk labels, in accordance with some embodiments.

FIGS. 4-6 depict example methods for detecting disengagement and generating messages for preventing disengagement (e.g., disengagement prevention incentives), in accordance with some embodiments. In some embodiments, one or more blocks of the methods may be executed substantially concurrently and/or in a different order than shown. In some implementations, a method may include more or fewer blocks than are shown. In some implementations, one or more of the blocks of a method may, at certain times, be ongoing and/or may repeat. In some implementations, blocks of the method may be combined.

The methods shown in FIGS. 4-6 may be implemented in the form of executable instructions stored on machine-readable media and executed by a processing resource and/or in the form of electronic circuitry. For example, aspects of the methods may be described below as being performed by a disengagement detection computing device 102, an example of which may be a risk identifier 130, a risk evaluator 134, a risk interpreter 136, an incentive generator 140, etc. running on a hardware processing resource 104 of the disengagement detection computing device 102 described above in reference to FIG. 1. Additionally, other aspects of the methods described below may be described with reference to other elements shown in FIG. 1 for non-limiting illustration purposes.

FIG. 4 depicts a flow diagram of a method for determining the predetermined risk labels, in accordance with some embodiments. The method 400 starts at operation (402). At the start the risk identifier is provided data including one or more types of disengagement descriptions. For example, the data can include a first type of disengagement descriptions and a second type of disengagement descriptions, distinct from the first type of disengagement descriptions. In some embodiments, the first type of disengagement descriptions are based on inputs or feedback provided by users, and the second type of disengagement descriptions are based on user profiles. The following operations of method 400 are performed for each user of the data.

The method 400 proceed to operation (404). At operation (404), the first type of disengagement description is analyzed to determine whether structured data is included. Structured data is information that is organized in a consistent format and can be accessed by both humans and computers. For example, disengagement descriptions for structured data can include selection from one or more predefined options in drop-down menus, radio buttons, sliding scales, etc. The method 400, in accordance with a determination that the first type of disengagement description includes structured data ("Yes" at operation 404), proceeds to operation (406) and determines a first risk label based on the structured data (e.g., maps the structured data to a first risk label $l_1$). The method 400 proceeds to operation (408) and determines whether unstructured data is included in the first type of disengagement description. Unstructured data is information that lacks a predetermined structure or format, including audio, text, and/or image data. For example, disengagement descriptions for unstructured data can include text in a free text form describing a disengagement reason. The method 400, in accordance with a determination that the first type of disengagement description does not include unstructured data ("No" at operation 408), performs operation (414) and includes the first risk label in a set of explicit risk labels (or includes the second risk label (if the same as the first risk label) in the set of explicit risk labels).

Alternative, the method 400, in accordance with a determination that the first type of disengagement description includes unstructured data ("Yes" at operation 408), includes performing operation (410), which determines a second risk label based on the unstructured data. In some embodiments, determining the second risk label based on the unstructured data includes determining one or more TF-IDF values for the unstructured data (e.g., maps unstructured data to TF-IDF values). The method 400 includes operation (412), at which it is determined whether the one or more TF-IDF values for the unstructured data satisfy TF-IDF thresholds for predetermined segments. Non-limiting examples of predetermined segments include usage (e.g., low usage a product or service), operational excellence (e.g., quality of a provided item or service), price sensitivity (e.g., resistance to price changes, or resilience to existing prices), etc. The method 400, in accordance with a determination that the one or more TF-IDF values for the unstructured data do not satisfy TF-IDF thresholds for predetermined segments ("No" at operation 412), returns to operation (414) and includes the first risk label in the set of explicit risk labels. Alternatively, the method 400, in accordance with a determination that the one or more TF-IDF values for the unstructured data satisfy TF-IDF thresholds for predetermined segments ("Yes" at operation 412), performs operation (416) and associates predetermined segment(s) (whose TF-IDF thresholds were satisfied) to the second risk label (e.g., maps segment(s) to second risk label $l_2$).

The method 400 includes operation (418). At operation 418, which follows operation (416), the method 400 includes determining whether the first risk label and the second risk label are the same. The method 400, in accordance with a determination that the first risk label and the second risk label are the same, returns to operation (414) and includes the first risk label (or the second risk label) in the set of explicit risk labels. Alternatively, the method 400, in accordance with a determination that the first risk label and the second risk label are not the same, proceeds to operation (420). At operation (420), the method 400 includes determining respective scores for the first risk label and the second risk label and selecting a respective risk label with a score that satisfies a risk label threshold to include in the set of explicit risk labels. In other words, if disengagement descriptions are provided in unstructured data and include disengagement reasons containing predetermined segments (or other keywords) identified through the TF-IDF, the risk label may be based on the unstructured data. Alternatively, if predetermined segments (or other keywords) are not identified in the unstructured data through the TF-IDF, a risk label may be based on the structed data. In situations where the risk labels based on the unstructured data and the risk labels based on the structured data are not the same, TF-IDF is performed on both keys and thresholds to determine the risk label.

Returning to operation (404), the method 400, in accordance with a determination that the first type of disengagement description does not include structured data ("No" at operation 404), proceeds to operation (422). At operation (422), the method 400 includes determining whether the first type of disengagement description includes unstructured data. The method 400, in accordance with a determination that the first type of disengagement description includes unstructured data ("Yes" at operation 422), includes performing operation (424). Operation (424) is analogous to operation (410). In other words, the method 400 includes determining TF-IDF values for the unstructured data. After operation (424), the method 400 proceeds to operation (426). Operation (426) is similar to operation (412), in that the method 400 includes determining whether the one or more TF-IDF values for the unstructured data satisfy TF-IDF thresholds for predetermined segments.

The method 400, in accordance with a determination that the one or more TF-IDF values for the unstructured data satisfy TF-IDF thresholds for predetermined segments ("Yes" at operation 426), performs operation (428), which is analogous to operation (416), and associates predetermined segment(s) (whose TF-IDF thresholds were satisfied) to the second risk label (e.g., maps segment(s) to second risk label $l_2$). The method 400 then proceeds to operation (430) and includes the second risk label in the set of explicit risk labels. Alternatively, in accordance with a determination that the one or more TF-IDF values for the unstructured data do not satisfy TF-IDF thresholds for predetermined segments ("No" at operation 426), the method 400 proceeds to operation (432).

At operation (432), the method 400 includes determining an implicit risk label. In some embodiments, determining the implicit risk label includes determining user profile data from a second type of disengagement description, determining an implicit risk label based on the user profile data, and including the implicit risk label in the predetermined risk labels. In other words, the first type of disengagement description could not be used to determine an explicit risk label, and a second type of disengagement description is used to generate implicit risk label. In some embodiments, user profile data can be determined from the first type of disengagement description and used to determine the implicit risk label. In some embodiments, determining the implicit risk label includes learning latent dealbreakers from the second type of disengagement description and quantifying with probability of a member belonging to a cluster. The dealbreaker probabilities may be normalized. In some embodiments, determining the implicit risk label includes modeling latent disengagement dealbreakers using inferences generated from the second type of disengagement description and clustering models (e.g., expectation-maximization clustering).

Returning to operation (422), the method 400, in accordance with a determination that the first type of disengagement description does not include unstructured data ("No" at operation 422), includes performing operation (432). In some embodiments, a "No" at operation 422 indicates that a subset of the first set of data analyzed is a second type of disengagement description and/or the first type of disengagement description could not be used to determine an explicit risk label.

The method 400 proceeds to operation 434 and finishes the method 400. Prior to ending the method 400, operation 434 includes combining the set explicit risk labels and the set of implicit risk labels to the predetermined risk labels.

FIG. 5 depicts a flow diagram of a method for detecting disengagement and generating disengagement prevention incentives, in accordance with some embodiments. The method 500 starts at operations (502) and proceeds to operation (504), which includes obtaining user data and input features. The method 500 includes operation (506) that includes determining, by a risk identifier, predetermined risk labels based on the user data. The predetermined risk labels identify disengagement risks. Determining the predetermined risk labels includes for each user of the user data, determining a type of disengagement description included in the user data; in accordance with a determination that the user data includes a first type of disengagement description, determining an explicit risk label; and in accordance with a determination that the user data includes a second type of disengagement description, distinct from the first type of disengagement description, determining an implicit risk label. Determining the predetermined risk labels further includes combining a set of explicit risk labels and a set of implicit risk labels from the user data to form the predetermined risk labels.

At operations (508) and (510), the method 500 includes determining, using a risk evaluator that receives the input features, a risk of disengagement for a user; and determining, using a risk interpreter that receives the input features and the predetermined risk labels, a disengagement reason for the user. The method 500 proceeds to operation (512) that includes determining, based on the risk of disengagement and the disengagement reason, a disengagement prevention incentive for the user. At operation (514), the method 500 includes transmitting, to a computing device associated with the user. The disengagement prevention incentive, when received by the computing device, causes the presentation of a user interface element for interacting with the disengagement prevention incentive. The method 500, after operation (514), proceeds to operation (516) and ends.

FIG. 6 depicts an example method expanding on the method for detecting disengagement and generating disengagement prevention incentives, in accordance with some embodiments. The method 600 includes one or more operations that run in conjunction with, before, and/or after one or more operations of method 500. As indicated above, in some embodiments, one or more blocks of the methods may be executed substantially concurrently and/or in a different order than shown.

In some embodiments, the method 600 includes operation (602), which expands on the determination of the explicit risk label. In particular, determining the explicit risk label includes determining whether the first type of disengagement description includes structured data; in accordance with a determination that the first type of disengagement description includes structured data, determining a first risk label based on the structured data; determining whether the first type of disengagement description includes unstructured data; in accordance with a determination that the first type of disengagement description includes unstructured data, determining a second risk label based on the unstructured data; and in accordance with a determination that the first and second risk labels are the same, including the first or second risk label in the set of explicit risk labels. The method 600 further includes operation (604), at which the method 400, in accordance with a determination that the first and second risk labels are different, includes determining respective scores for the first and second risk labels and selecting a respective risk label with a score that satisfies a risk label threshold to include in the set of explicit risk labels. The method 600 also includes operation (606), which provides determining the second risk label based on the unstructured data includes determining a TF-IDF value for the unstructured data and in accordance with a determination that the TF-IDF value for the unstructured data satisfies a TF-IDF threshold for predetermined segment, associating the predetermined segment to the second risk label.

The method 600 includes operation (608) that includes, in accordance with a determination that the first type of disengagement description includes structured data (without unstructured data), determining a first risk label based on the structured data and including the first risk label in the set of explicit risk labels. The method 600 also includes operation (610), which provides in accordance with a determination that the first type of disengagement description includes unstructured data (without structured data), determining a second risk label based on the unstructured data and including the second risk label in the set of explicit risk labels. The method 600 further includes operation (612) that provides determining the implicit risk label includes determining user profile data from the second type of disengagement description; determining an implicit risk label based on the user profile data; and including the implicit risk label in the set of implicit risk labels.

FIG. 7 depicts an example system 700 that includes non-transitory, machine-readable media 704 encoded with example instructions executable by processing resource 702. In some implementations, the system 700 may be useful for implementing aspects of the disengagement detection computing device 102 of FIG. 1 and analogous systems (e.g., disengagement detection and prevention system 200; FIG. 2). For example, the instructions encoded on machine-readable media 704 may be included in instructions 108 of FIG. 1. In some implementations, functionality described with respect to FIG. 1 may be included in the instructions encoded on machine-readable media 704.

The processing resource 702 may include a microcontroller, a microprocessor, central processing unit core(s), an ASIC, an FPGA, and/or other hardware device suitable for retrieval and/or execution of instructions from the machine-readable media 704 to perform functions related to various examples. Additionally or alternatively, the processing resource 702 may include or be coupled to electronic circuitry or dedicated logic for performing some or all of the functionality of the instructions described herein.

The machine-readable media 704 may be any medium suitable for storing executable instructions, such as RAM, ROM, EEPROM, flash memory, a hard disk drive, an optical disc, or the like. In some example implementations, the machine-readable media 704 may be a tangible, non-transitory medium. The machine-readable media 704 may be disposed within the system 700 respectively, in which case the executable instructions may be deemed installed or embedded on the system. Alternatively, the machine-readable media 704 may be a portable (e.g., external) storage medium, and may be part of an installation package.

As described further herein below, the machine-readable media 704 may be encoded with a set of executable instructions. It should be understood that part or all of the executable instructions and/or electronic circuits included within one box may, in alternate implementations, be included in a different box shown in the figures or in a different box not shown. Some implementations may include more or fewer instructions than are shown in FIG. 7.

With reference to FIG. 7, the machine-readable media 704 includes instructions 706-716. Instructions 706, when executed, cause the processing resource 702 to obtain user data and input features. Instructions 708, when executed, cause the processing resource 702 to determine, by a risk identifier, predetermined risk labels based on the user data, the predetermined risk labels identifying disengagement risks. Instructions 710, when executed, cause the processing resource 702 to determine, using a risk evaluator that receives the input features, a risk of disengagement for a user. Instructions 712, when executed, cause the processing resource 702 to determine, using a risk interpreter that receives the input features and the predetermined risk labels, a disengagement reason for the user. Instructions 714, when executed, cause the processing resource 702 to determine, based on the risk of disengagement and the disengagement reason, a disengagement prevention incentive for the user. Instructions 716, when executed, cause the processing resource 702 to transmit, to a computing device associated with the user, the disengagement prevention incentive that causes the presentation of a user interface element for interacting with the disengagement prevention incentive.

In some embodiments, training data is generated for one or more models (e.g., machine learning models, deep learning models, statistical models, algorithms, etc.) based on historical data and features described above in reference to FIGS. 2 and 4-6. One or more models are trained based on corresponding training data. The trained models may be stored in a database, such as in a database (e.g., a cloud storage database).

The models, when executed by the disengagement detection computing device 102, allow the disengagement detection computing device 102 to detect users at risk of disengagement and generate personalized messages or incentives for and/or personalized countermeasures for preventing disengagement. For example, the disengagement detection computing device 102, in response to receiving user data may execute one or more models to determine which users at are at risk of disengagement and transmit a personalized incentive to the at-risk users. A user computing device 126 may then receive the personalized incentive and engage with the incentive and/or provide additional feedback.

In some embodiments, the disengagement detection computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some embodiments, the virtual machines assign each model (or part thereof) among a plurality of processing units. Based on the output of the models, the disengagement detection computing device 102 may generate personalized incentives for users determined to be at risk of disengagement.

Figure 8:
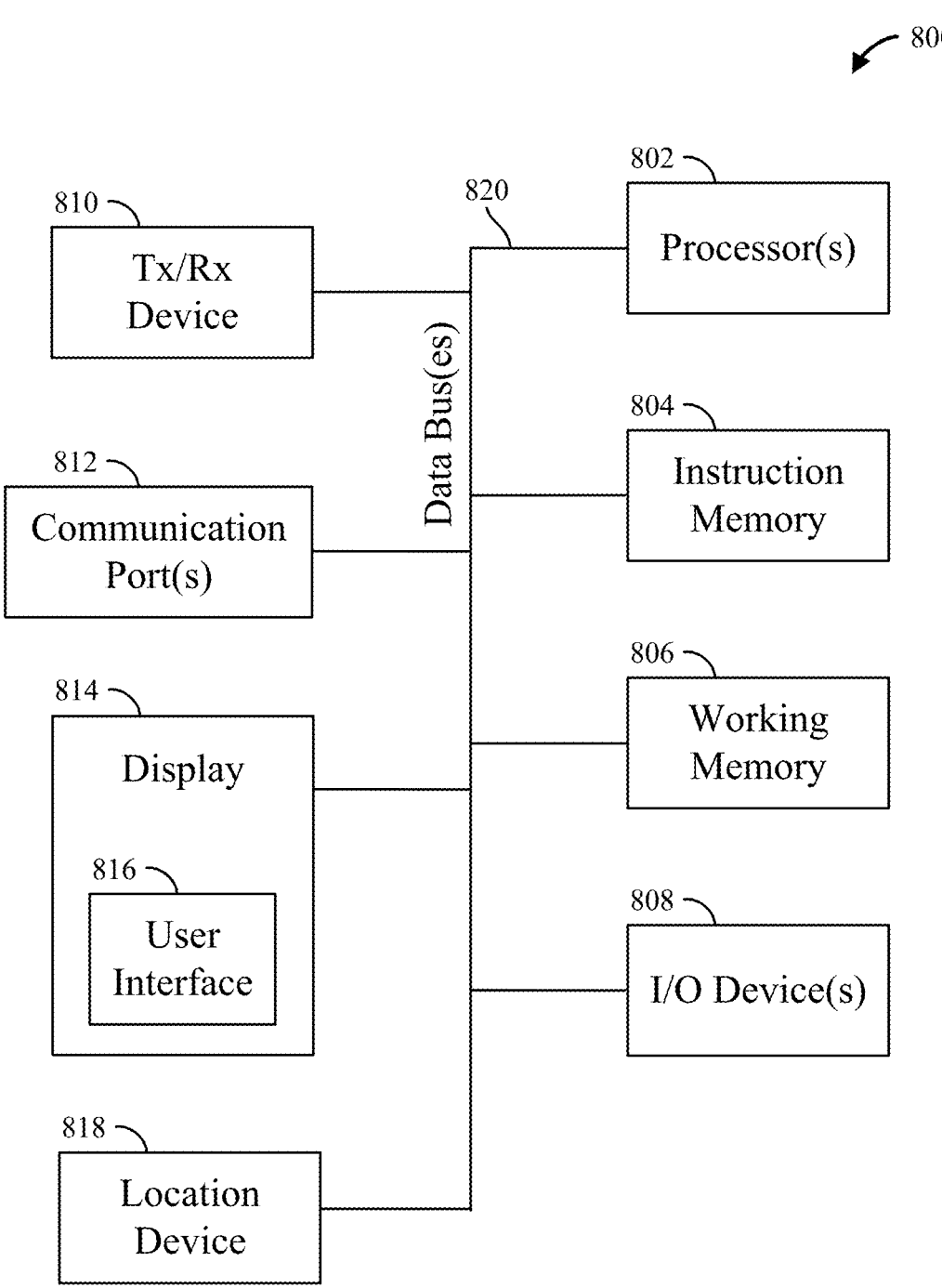
FIG. 8 depicts an example computer system that implements one or more of the disclosed processes, in accordance with some embodiments.

FIG. 8 illustrates a block diagram of a computing device 800, in accordance with some embodiments. Although FIG. 8 is described with respect to certain components shown therein, it will be appreciated that the elements of the computing device 800 may be combined, omitted, and/or replicated. In addition, it will be appreciated that additional elements other than those illustrated in FIG. 8 may be added to the computing device.

As shown in FIG. 8, the computing device 800 may include one or more processing resources 802, instruction memory 804, working memory 806, input/output devices 808, transceiver 810, communication ports 812, display 814, optional location device 818, and/or any other suitable elements each operatively coupled to one or more data buses 820. The data buses 820 allow for communication among the various components. The data buses 820 may include wired, or wireless, communication channels.

The one or more processing resources 802 may include any processing circuitry operable to control operations of the computing device 800. In some embodiments, the one or more processing resources 802 include one or more distinct processors, each having one or more cores (e.g., processing circuits). Each of the distinct processors may have the same or different structure. The one or more processing resources 802 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processing resources 802 may also be implemented by a controller, a microcontroller, an application specific integrated circuit (ASIC), a field programmable gate array (FPGA), a programmable logic device (PLD), etc.

In some embodiments, the one or more processing resources 802 implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 804 may store instructions that are accessed (e.g., read) and executed by at least one of the one or more processing resources 802. For example, the instruction memory 804 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processing resources 802 may perform a certain function or operation by executing code, stored on the instruction memory 804, embodying the function or operation. For example, the one or more processing resources 802 may execute code stored in the instruction memory 804 to perform one or more of any function, method, or operation disclosed herein.

Additionally, the one or more processing resources 802 may store data to, and read data from, the working memory 806. For example, the one or more processing resources 802 may store a working set of instructions to the working memory 806, such as instructions loaded from the instruction memory 804. The one or more processing resources 802 may also use the working memory 806 to store dynamic data created during one or more operations. The working memory 806 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 804 and working memory 806, it will be appreciated that the computing device 800 may include a single memory unit that operates as both instruction memory and working memory. Further, although embodiments are discussed herein including non-volatile memory, it will be appreciated that computing device 800 may include volatile memory components in addition to at least one non-volatile memory component.

In some embodiments, the instruction memory 804 and/or the working memory 806 includes an instruction set, in the form of a file for executing various methods, such as methods for detecting disengagement and generating disengagement prevention incentives, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter converts the instruction set into machine executable code for execution by the one or more processing resources 802.

The input/output devices 808 may include any suitable device that allows for data input or output. For example, the input/output devices 808 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 810 and/or the communication port(s) 812 allow for communication with a network. For example, if a communication network is a cellular network, the transceiver 810 allows communications with the cellular network. In some embodiments, the transceiver 810 is selected based on the type of the communication network the computing device 800 will be operating in. The one or more processing resources 802 are operable to receive data from, or send data to, a network, via the transceiver 810.

The communication port(s) 812 may include any suitable hardware, software, and/or combination of hardware and software that is capable of coupling the computing device 800 to one or more networks and/or additional devices. The communication port(s) 812 may be arranged to operate with any suitable technique for controlling information signals using a desired set of communications protocols, services, or operating procedures. The communication port(s) 812 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 812 allows for the programming of executable instructions in the instruction memory 804. In some embodiments, the communication port(s) 812 allow for the transfer (e.g., uploading or downloading) of data, such as machine learning model training data.

In some embodiments, the communication port(s) 812 couples the computing device 800 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 810 and/or the communication port(s) 812 utilize one or more communication protocols. Examples of wired protocols may include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 814 may be any suitable display, and may display the user interface 816. The user interfaces 816 may enable user interaction with a disengagement detection and prevention system. For example, the user interface 816 may be a user interface for an application of a network environment operator that allows a user to view and interact with the operator's website. In some embodiments, a user may interact with the user interface 816 by engaging the input/output devices 808. In some embodiments, the display 814 may be a touchscreen, where the user interface 816 is displayed on the touchscreen.

The display 814 may include a screen such as, for example, a Liquid Crystal Display (LCD) screen, a light-emitting diode (LED) screen, an organic LED (OLED) screen, a movable display, a projection, etc. In some embodiments, the display 814 may include a coder/decoder, also known as Codecs, to convert digital media data into analog signals. For example, the visual peripheral output device may include video Codecs, audio Codecs, or any other suitable type of Codec.

The optional location device 818 may be communicatively coupled to a location network and operable to receive position data from the location network. For example, in some embodiments, the location device 818 includes a GPS device that receives position data identifying a latitude and longitude from one or more satellites of a GPS constellation. As another example, in some embodiments, the location device 818 is a cellular device that receives location data from one or more localized cellular towers. Based on the position data, the computing device 800 may determine a local geographical area (e.g., town, city, state, etc.) of its position.

In some embodiments, the computing device 800 implements one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality that (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations, and should generally not be limited to any particular example implementation herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

In some embodiments, the computing device 800 may be a computer, a workstation, a laptop, a server such as a cloud-based server, or any other suitable device. In some embodiments, the computing device 800 is a server that includes one or more processing units, such as one or more graphical processing units (GPUs), one or more central processing units (CPUs), and/or one or more processing cores. The computing device 800 may, in some embodiments, execute one or more virtual machines. In some embodiments, processing resources (e.g., capabilities) of the computing device 800 are offered as a cloud-based service (e.g., cloud computing).

Although embodiments are illustrated herein including certain systems and/or devices, it will be appreciated that additional systems, servers, storage mechanism, etc. may be included. In addition, although embodiments are illustrated herein having individual, discrete systems, it will be appreciated that, in some embodiments, one or more systems may be combined into a single logical and/or physical system. Similarly, although embodiments are illustrated having a single instance of each device or system, it will be appreciated that additional instances of a device may be implemented. In some embodiments, two or more systems may be operated on shared hardware in which each system operates as a separate, discrete system utilizing the shared hardware, for example, according to one or more virtualization schemes.

Based on the training data of the training model, the trained function is able to adapt to new circumstances and to detect and extrapolate patterns. In general, parameters of a trained function may be adapted by means of training. In particular, a combination of supervised training, semi-supervised training, unsupervised training, reinforcement learning and/or active learning may be used. Furthermore, representation learning (an alternative term is "feature learning") may be used. In particular, the parameters of the trained functions may be adapted iteratively by several steps of training.

It will be appreciated that disengagement risks determined by the disengagement detection computing device 102 based on user data as disclosed herein, particularly on large datasets intended to be used with a risk identifier 130 and/or a risk interpreter 136 (or other components of the disengagement detection computing device 102), is only possible with the aid of computer-assisted machine-learning algorithms and techniques. In some embodiments, machine learning processes are used to perform operations that cannot practically be performed by a human, either mentally or with assistance. It will be appreciated that a variety of machine learning techniques can be used alone or in combination to generate the predetermined risk labels, risks of disengagement, disengagement reasons, disengagement prevention incentives, etc.

Although the subject matter has been described in terms of example embodiments, it is not limited thereto. Rather, the appended claims should be construed broadly, to include other variants and embodiments that may be made by those skilled in the art.

What is claimed is:

1. A system, comprising:
a processor; and
a non-transitory memory storing instructions, that when executed, cause the processor to:
  obtain user data and input features;
  determine, by a risk identifier, predetermined risk labels based on the user data, wherein the predetermined risk labels identify disengagement risks, and determining the predetermined risk labels includes:
    for each user of the user data:
      determining a type of disengagement description included in the user data;
      in accordance with a determination that the user data includes a first type of disengagement description, determining an explicit risk label, and
      in accordance with a determination that the user data includes a second type of disengagement description, distinct from the first type of disengagement description, determining an implicit risk label;
      combining each of the explicit risk labels into a set of explicit risk labels, and each of the implicit risk labels into a set of implicit risk labels; and
      combining the set of explicit risk labels and the set of implicit risk labels from the user data to form the predetermined risk labels;
  determine, using a first trained machine learning model that receives the input features, a first score vale characterizing a risk of disengagement for a user, wherein the first trained machine learning model is assigned to a first virtual machine that executes on a first processing resource;
  determine, using a second trained machine learning model that receives the input features and the predetermined risk labels, a second score value characterizing a disengagement reason for the user, wherein the second trained machine learning model is assigned to a second virtual machine that executes on a second processing resource;
  generate a risk score based on the first score value characterizing the risk of disengagement and the second score value characterizing the disengagement reason;
  determine, based on the risk score, a disengagement prevention incentive for the user; and
  transmit, to a computing device associated with the user, the disengagement prevention incentive, wherein the disengagement prevention incentive causes the computing device to display a user interface element for interacting with the disengagement prevention incentive.

2. The system of claim 1, wherein determining the explicit risk label comprises:
  determining whether the first type of disengagement description includes structured data;

in accordance with a determination that the first type of disengagement description includes structured data, determining a first risk label based on the structured data;
  determining whether the first type of disengagement description includes unstructured data;
  in accordance with a determination that the first type of disengagement description includes unstructured data, determining a second risk label based on the unstructured data;
  determining whether the first risk label and the second risk label are the same; and
  in accordance with a determination that the first risk label and the second risk label are the same, including the first risk label or the second risk label in the set of explicit risk labels.

3. The system of claim 2, wherein determining the explicit risk label comprises:
  determining whether the first risk label and the second risk label are different;
  in accordance with a determination that the first risk label and the second risk label are different, determining respective scores for the first risk label and the second risk label; and
  selecting a respective risk label with a score that satisfies a risk label threshold to include in the set of explicit risk labels.

4. The system of claim 2, wherein determining the second risk label based on the unstructured data comprises:
  determining a term frequency-inverse document frequency (TF-IDF) value for the unstructured data; and
  in accordance with a determination that the TF-IDF value for the unstructured data satisfies a TF-IDF threshold for a predetermined segment, associating the predetermined segment to the second risk label.

5. The system of claim 1, wherein determining the explicit risk label comprises:
  determining whether the first type of disengagement description includes structured data; and
  in accordance with a determination that the first type of disengagement description includes structured data:
    determining a first risk label based on the structured data, and
    including the first risk label in the set of explicit risk labels.

6. The system of claim 1, wherein determining the explicit risk label comprises:
  determining whether the first type of disengagement description includes unstructured data; and
  in accordance with a determination that the first type of disengagement description includes unstructured data:
    determining a second risk label based on the unstructured data, and
    including the second risk label in the set of explicit risk labels.

7. The system of claim 1, wherein determining the implicit risk label comprises:
  determining user profile data from the second type of disengagement description;
  determining an implicit risk label based on the user profile data; and
  including the implicit risk label in the set of implicit risk labels.

8. A computer-implemented method, comprising:
  obtaining user data and input features;
  determining, by a risk identifier, predetermined risk labels based on the user data, wherein the predetermined risk labels identify disengagement risks and determining the predetermined risk labels includes:

for each user of the user data:

determining a type of disengagement description included in the user data;

in accordance with a determination that the user data includes a first type of disengagement description, determining an explicit risk label, and in accordance with a determination that the user data includes a second type of disengagement description, distinct from the first type of disengagement description, determining an implicit risk label;

combining each of the explicit risk labels into a set of explicit risk labels, and each of the implicit risk labels into a set of implicit risk labels; and combining the set of explicit risk labels and the set of implicit risk labels from the user data to form the predetermined risk labels;

determining, using a first trained machine learning model that receives the input features, a first score value characterizing a risk of disengagement for a user, wherein the first trained machine learning model is assigned to a first virtual machine that executes on a first processing resource;

determining, using a second trained machine learning model that receives the input features and the predetermined risk labels, a second score value characterizing a disengagement reason for the user, wherein the second trained machine learning model is assigned to a second virtual machine that executes on a second processing resource;

generating a risk score based on the first score value characterizing the risk of disengagement and the second score value characterizing the disengagement reason;

determining, based on the risk score a disengagement prevention incentive for the user; and transmitting, to a computing device associated with the user, the disengagement prevention incentive, wherein the disengagement prevention incentive causes the computing device to display a user interface element for interacting with the disengagement prevention incentive.

9. The computer-implemented method of claim 8, wherein determining the explicit risk label comprises:

determining whether the first type of disengagement description includes structured data;

in accordance with a determination that the first type of disengagement description includes structured data, determining a first risk label based on the structured data;

determining whether the first type of disengagement description includes unstructured data;

in accordance with a determination that the first type of disengagement description includes unstructured data, determining a second risk label based on the unstructured data;

determining whether the first risk label and the second risk label are the same; and in accordance with a determination that the first risk label and the second risk label are the same, including the first risk label or the second risk label in the set of explicit risk labels.

10. The computer-implemented method of claim 9, wherein determining the explicit risk label comprises:

determining whether the first risk label and the second risk label are different;

in accordance with a determination that the first risk label and the second risk label are different, determining respective scores for the first risk label and the second risk label; and selecting a respective risk label with a score that satisfies a risk label threshold to include in the set of explicit risk labels.

11. The computer-implemented method of claim 9, wherein determining the second risk label based on the unstructured data comprises:

determining a term frequency-inverse document frequency (TF-IDF) value for the unstructured data; and in accordance with a determination that the TF-IDF value for the unstructured data satisfies a TF-IDF threshold for a predetermined segment, associating the predetermined segment to the second risk label.

12. The computer-implemented method of claim 8, wherein determining the explicit risk label comprises:

determining whether the first type of disengagement description includes structured data; and in accordance with a determination that the first type of disengagement description includes structured data:

determining a first risk label based on the structured data, and including the first risk label in the set of explicit risk labels.

13. The computer-implemented method of claim 8, wherein determining the explicit risk label comprises:

determining whether the first type of disengagement description includes unstructured data; and in accordance with a determination that the first type of disengagement description includes unstructured data:

determining a second risk label based on the unstructured data, and including the second risk label in the set of explicit risk labels.

14. The computer-implemented method of claim 8, wherein determining the implicit risk label comprises:

determining user profile data from the second type of disengagement description;

determining an implicit risk label based on the user profile data; and including the implicit risk label in the set of implicit risk labels.

15. A non-transitory computer readable medium having instructions stored thereon, wherein the instructions, when executed by at least one processor, cause at least one device to perform operations comprising:

obtaining user data and input features;

determining, by a risk identifier, predetermined risk labels based on the user data, wherein the predetermined risk labels identify disengagement risks and determining the predetermined risk labels includes:

for each user of the user data:

determining a type of disengagement description included in the user data;

in accordance with a determination that the user data includes a first type of disengagement description, determining an explicit risk label, and in accordance with a determination that the user data includes a second type of disengagement description, distinct from the first type of disengagement description, determining an implicit risk label;

combining each of the explicit risk labels into a set of explicit risk labels, and each of the implicit risk labels into a set of implicit risk labels; and combining the set of explicit risk labels and the set of implicit risk labels from the user data to form the predetermined risk labels;

determining, using a first trained machine learning model that receives the input features, a first score value characterizing a risk of disengagement for a user, wherein the first trained machine learning model is assigned to a first virtual machine that executes on a first processing resource;

determining, using a second trained machine learning model that receives the input features and the predetermined risk labels, a second score value characterizing a disengagement reason for the user, wherein the second trained machine learning model is assigned to a second virtual machine that executes on a second processing resource;

generating a risk score based on the first score value characterizing the risk of disengagement and the second score value characterizing the disengagement reason;

determining, based on the risk score a disengagement prevention incentive for the user; and transmitting, to a computing device associated with the user, the disengagement prevention incentive, wherein the disengagement prevention incentive causes the computing device to display a user interface element for interacting with the disengagement prevention incentive.

16. The non-transitory computer readable medium of claim 15, wherein determining the explicit risk label comprises:

determining whether the first type of disengagement description includes structured data;

in accordance with a determination that the first type of disengagement description includes structured data, determining a first risk label based on the structured data;

determining whether the first type of disengagement description includes unstructured data;

in accordance with a determination that the first type of disengagement description includes unstructured data, determining a second risk label based on the unstructured data;

determining whether the first risk label and the second risk label are the same; and in accordance with a determination that the first risk label and the second risk label are the same, including the first risk label or the second risk label in the set of explicit risk labels.

17. The non-transitory computer readable medium of claim 16, wherein determining the explicit risk label comprises:

determining whether the first risk label and the second risk label are different;

in accordance with a determination that the first risk label and the second risk label are different, determining respective scores for the first risk label and the second risk label; and selecting a respective risk label with a score that satisfies a risk label threshold to include in the set of explicit risk labels.

18. The non-transitory computer readable medium of claim 16, wherein determining the second risk label based on the unstructured data comprises:

determining a term frequency-inverse document frequency (TF-IDF) value for the unstructured data; and in accordance with a determination that the TF-IDF value for the unstructured data satisfies a TF-IDF threshold for a predetermined segment, associating the predetermined segment to the second risk label.

19. The non-transitory computer readable medium of claim 15, wherein determining the explicit risk label comprises:

determining whether the first type of disengagement description includes structured data; and in accordance with a determination that the first type of disengagement description includes structured data:

determining a first risk label based on the structured data, and including the first risk label in the set of explicit risk labels.

20. The non-transitory computer readable medium of claim 15, wherein determining the implicit risk label comprises:

determining user profile data from the second type of disengagement description;

determining an implicit risk label based on the user profile data; and including the implicit risk label in the set of implicit risk labels.

* * * * *